United States Patent
Trezevant et al.

(10) Patent No.: US 8,077,183 B1
(45) Date of Patent: Dec. 13, 2011

(54) STEPMODE ANIMATION VISUALIZATION

(75) Inventors: Warren Trezevant, Oakland, CA (US); Tom Hahn, Piedmont, CA (US); Robert Jensen, Berkeley, CA (US)

(73) Assignee: Pixar, Emeryville, CA (US)

( * ) Notice: Subject to any disclaimer, the term of this patent is extended or adjusted under 35 U.S.C. 154(b) by 612 days.

(21) Appl. No.: 12/248,830

(22) Filed: Oct. 9, 2008

(51) Int. Cl.
- *G06F 17/00* (2006.01)
- *G06F 3/048* (2006.01)
- *G06F 3/00* (2006.01)
- *G09G 5/00* (2006.01)
- *G09G 5/02* (2006.01)
- *G06T 13/00* (2006.01)
- *G06K 9/40* (2006.01)
- *G06K 9/32* (2006.01)
- *G06K 9/36* (2006.01)

(52) U.S. Cl. ........ 345/581; 345/418; 345/606; 345/619; 345/473; 382/254; 382/274; 382/276; 382/300; 715/200; 715/273; 715/700; 715/764

(58) Field of Classification Search .......... 345/418–419, 345/581, 606, 618–619, 473–475, 586, 643; 382/254, 274, 276, 300; 715/200, 232, 273, 715/275, 700, 764
See application file for complete search history.

(56) References Cited

U.S. PATENT DOCUMENTS

| | | | |
|---|---|---|---|
| 2004/0130550 A1* | 7/2004 | Blanco et al. | 345/473 |
| 2006/0192783 A1* | 8/2006 | Kass et al. | 345/473 |
| 2008/0036763 A1* | 2/2008 | Chen et al. | 345/422 |
| 2009/0179901 A1* | 7/2009 | Girard | 345/474 |
| 2010/0214313 A1* | 8/2010 | Herman et al. | 345/593 |

* cited by examiner

*Primary Examiner* — Wesner Sajous
(74) *Attorney, Agent, or Firm* — Law Office of Jonathan Hollander PC (57) ABSTRACT

A stepmode animation visualization emphasizes authored values of computer graphics variables. Users select all or a portion of the computer graphics variables associated with objects in a scene to be included in the stepmode animation visualization. When users activate the stepmode animation visualization, the generated values of the selected computer graphics variables are overridden with authored values of the selected computer graphics variables. For example, the stepmode animation visualization overrides each generated value of a computer graphics variable with the nearest preceding authored value of that computer graphics variable. Users may repeatedly activate and deactivate the stepmode animation visualization without reselecting computer graphics variables. The selection of computer graphics variables affected by the stepmode animation visualization is maintained. All or a portion of the animation may be looped or repeated while the stepmode animation visualization is active.

24 Claims, 4 Drawing Sheets

STEPMODE ANIMATION VISUALIZATION

BACKGROUND

The present invention relates to the field of computer graphics, and in particular to methods and apparatus for assigning attribute values to surfaces of computer graphics models. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

In computer-generated animation, an object's appearance is defined by a three-dimensional computer model. To appear realistic, the computer model of an object is often extremely complex, having millions of surfaces and tens of thousands of attributes. Due to the complexity involved with animating such complex models, particularly character models with hundreds or thousands of degrees of freedom, animation tools often rely on computer graphics variables and associated computer graphics variable functions to define the attributes of objects. Examples of computer graphics variables include animation variables, shader relationships, weighting relationships, and mappings of influence between computer graphics components. Computer graphics variable functions associate input values to a corresponding output values according to some rule or mathematical expression. Computer graphics variable functions may be functions of an input time variable or any other type of input.

For example, animation variables, which are sometimes referred to as avars, are parameters used by functions to modify the position, or pose, of all or a portion of a model. Animation variables and their associated functions can specify relatively simple motions, such as the translation and rotation of objects. Animation variables and their associated functions are also used to abstract complicated modifications to a model to a relatively simple control. For example, animation variables can specify the rotation angles of the joints of a character model, thereby positioning the character model's limbs and appendages. More complicated animation variables can define the degree of opening of a character's mouth. In this example, the value of a single animation variable is provided to one or more computer graphics variable functions to determine the positions of many different parts of the character model needed to open the characters mouth to the desired degree. In this example, animation software tools then modify the character model according to the outputs of the computer graphics variable functions to produce a character model posed with an open mouth.

Users define computer graphics images and animated sequences by specifying the values of computer graphics variables of an object, and hence the pose of an object, at one or more key frames. A pair of a computer graphics variable value and its associated input value, such as a time value, is referred to as a knot. A set of one or more knots at a given input value defined by a user or another application, such as an inverse kinematic system, is referred to as an authored pose of an object.

Based on the authored poses of one or more objects, an animation system determines the poses of object for frames, time values, or any other type of input values where authored poses are not defined. Typically, animation systems interpolate the values of its computer graphics variables from the knots of authored knots. A variety of different interpolation schemes are used in animation, including linear, cubic, b-spline, Bezier, and Catmull-Rom. Typically, animation tools will display a line or curve, such as a spline curve, defined by one or more knots of a computer graphics variable and the interpolation scheme.

Precise control of the timing, rhythm, values, and interpolation of computer graphics variable knots is essential to achieving artistically effective animation. Subtle adjustments in the value, timing, and interpolation of knots can greatly change the artistic impact of animation. During animation, many gestures or actions are comprised of large numbers of knots from one or more computer graphics variables acting in concert to achieve the desired motion. For example, a sequence of knots of a single computer graphics variable might define how a character's mouth opens during a sequence of dialog. In another example, a sequence of knots for multiple computer graphics variables might define a character's arm and hand movements while waving or pointing.

Because animation is often defined by large numbers of related computer graphics variable knots, it is often difficult for users to identify the visual and aesthetic contribution of specific computer graphics variable knots to complicated animations. In particular, the timing and rhythm of specific computer graphics variable knots are difficult to discern within complicated animations.

SUMMARY

An embodiment of the invention includes a stepmode animation visualization for emphasizing authored values of computer graphics variables. In an embodiment, users select all or a portion of the computer graphics variables associated with one or more objects or other entities in a scene to be included in the stepmode animation visualization. When users activate the stepmode animation visualization, the generated values of the selected computer graphics variables are overridden with authored values of the selected computer graphics variables. In one embodiment, the stepmode animation visualization overrides each generated value of a computer graphics variable with the nearest preceding authored value of that computer graphics variable.

An embodiment of the invention allows users to repeatedly activate and deactivate the stepmode animation visualization without reselecting computer graphics variables. In this embodiment, the selection of computer graphics variables affected by the stepmode animation visualization is maintained independently of the activation state of the computer graphics variables.

In an embodiment, a user may activate a stepmode animation visualization at any time while viewing or authoring values of computer graphics variables. Additionally, users may view a scene defined by computer graphics variables with or without the stepmode animation visualization. While active, the stepmode animation visualization overrides the generated values of one or more computer graphics variables. For example, an animation software application may display an animation of a character model based on the values of its computer graphics variables. When the stepmode animation visualization is active, the animation will be altered to emphasize the authored values of the animation variables. In additional embodiments, the animation may be displayed at its intended playback speed or at a different playback when the stepmode animation visualization is active. All or a portion of the animation may be looped or repeated while the stepmode animation visualization is active.

A typical animation includes portions defined by generated values for the time values between authored values of computer graphics variables. In an embodiment, each of these portions of the animation will be displayed for a period of time proportional to its associated time interval while the stepmode animation visualization is active. For the duration of each associated time interval, an embodiment of the stepmode animation visualization holds the selected computer graphics variables to their most recent previous authored values. This emphasizes the contribution of authored values to the overall animation as well as the timing and rhythm of the animation.

In addition to displaying an animation, an embodiment of an animation software interface allows users to modify computer graphics variables while the stepmode animation visualization is active. For example, a user may modify the values of authored knots of animation variables, modify the time values of authored knots of animation variables, and/or add new authored knots to animation variables at any time values. In a further embodiment, an animation software interface allows users to modify computer graphics variables interactively while the stepmode animation visualization is active and the associated animation is being played or looped. This embodiment allows users to modify the adjustments to the timing or values of authored knots of selected animation variables and see the results of these adjustments to the animation immediately.

BRIEF DESCRIPTION OF THE DRAWINGS

The invention will be described with reference to the drawings, in which.

DETAILED DESCRIPTION

Figure 1:
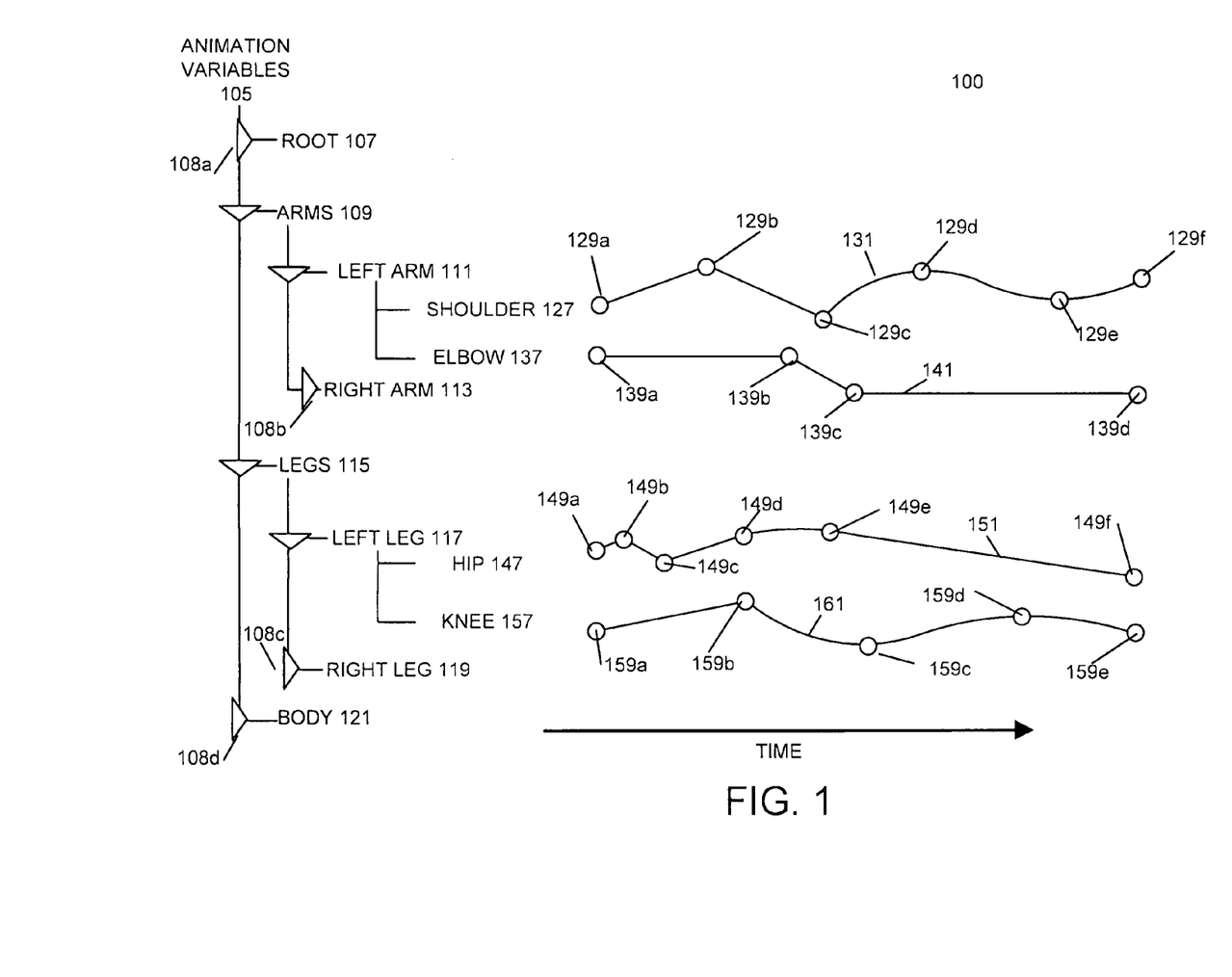
FIG. 1 illustrates an example animation software interface according to an embodiment of the invention.

FIG. 1 illustrates an example animation software interface 100 according to an embodiment of the invention. Animation software interface 100 presents a set of animation variables 105. In an embodiment, the animation software interface 100 arranges the set of animation variables 105 into groups and/or according to a hierarchy to assist users in finding and manipulating animation variables 105. Example animation software interface 100 includes a root group 107, an arms group 109, a legs group 115, and a body group 121. Groups may include one or more animation variables and/or one or more subgroups. In example animation software interface 100, arms group 109 includes left arm group 111 and right arm group 113. Legs group 115 includes left leg group 117 and right leg group 119. In an embodiment, groups may be expanded to reveal their sub-groups and/or animation variables or collapsed to hide their sub-groups and/or animation variables. Example animation software interface 100 includes expansion controls 108, including expansion controls 108a, 108b, 108c, and 108d, for expanding or collapsing groups.

Example animation software interface 100 includes shoulder animation variable 127, elbow animation variable 137, hip animation variable 147, and knee animation variable 157. In this example, animation variables 105 including shoulder animation variable 127, elbow animation variable 137, hip animation variable 147, and knee animation variable 157 parameterized according to time input values.

Each of the animation variables 105 is associated with one or more knots or control points. Each knot specifies a value of the animation variable for a time input value. Animation variable knots may be specified by users or by other applications, such as inverse kinematics systems. In general, a knot of a computer graphics variable such as an animation variable is referred to as an authored value of the computer graphics variable, because it is specified explicitly by a user or an application. A set of knots defined for a set of animation variables of an object at a specific time input value is referred to as the authored pose of the object at that time input value.

Animation and computer graphics software applications determine the values of computer graphics variables at input values without defined knots using interpolation or other techniques. For example, an animation software application may interpolate between two or more knots of an animation variable to determine the value of the animation variable for frames or time input values between the knots of the animation variable. Embodiments of animation software applications may use a variety of interpolation schemes, including linear, cubic, b-spline, Bezier, and Catmull-Rom techniques. In general, the values of computer graphics variables that are not specified by knots are referred to as the generated values of the computer graphics variable.

Example animation software interface 100 displays the authored and generated values of animation variables. In an embodiment, animation software interface 100 displays the authored values of animation variables as highlighted points and the generated values of animation variables as lines or curves, such as a spline curve. For example, animation software interface displays the authored values of shoulder animation variable 127 as points 129a, 129b, 129c, 129d, 129e, and 129f. Animation software interface 100 displays the generated values of shoulder animation variable 127 as curve 131. Similarly, animation software interface 100 displays the authored values of elbow animation variable 137 as points 139a, 139b, 139c, and 139d and its generated values as curve 141. Animation software interface 100 displays the authored values of hip animation variable 147 as points 149a, 149b, 149c, 149d, 149e, and 149f and its generated values as curve 151. Animation software interface 100 displays the authored values of knee animation variable 157 as points 159a, 159b, 159c, 159d, and 159e and its generated values as curve 161.

In example animation software interface 100, the animation variables 127, 137, 147, and 149 are expressed as functions of input time values. However, embodiments of example animation software interface 100 are also applicable to any type of computer graphics variable parameterized by inputs other than time. Additionally, the groups and animation variables shown in example animation software interface 100 are intended to illustrate one application of embodiments of the invention. However, embodiments of example animation software interface may include any arbitrary number and types of computer graphics variables arranged with or without groups or hierarchies.

Figure 2:
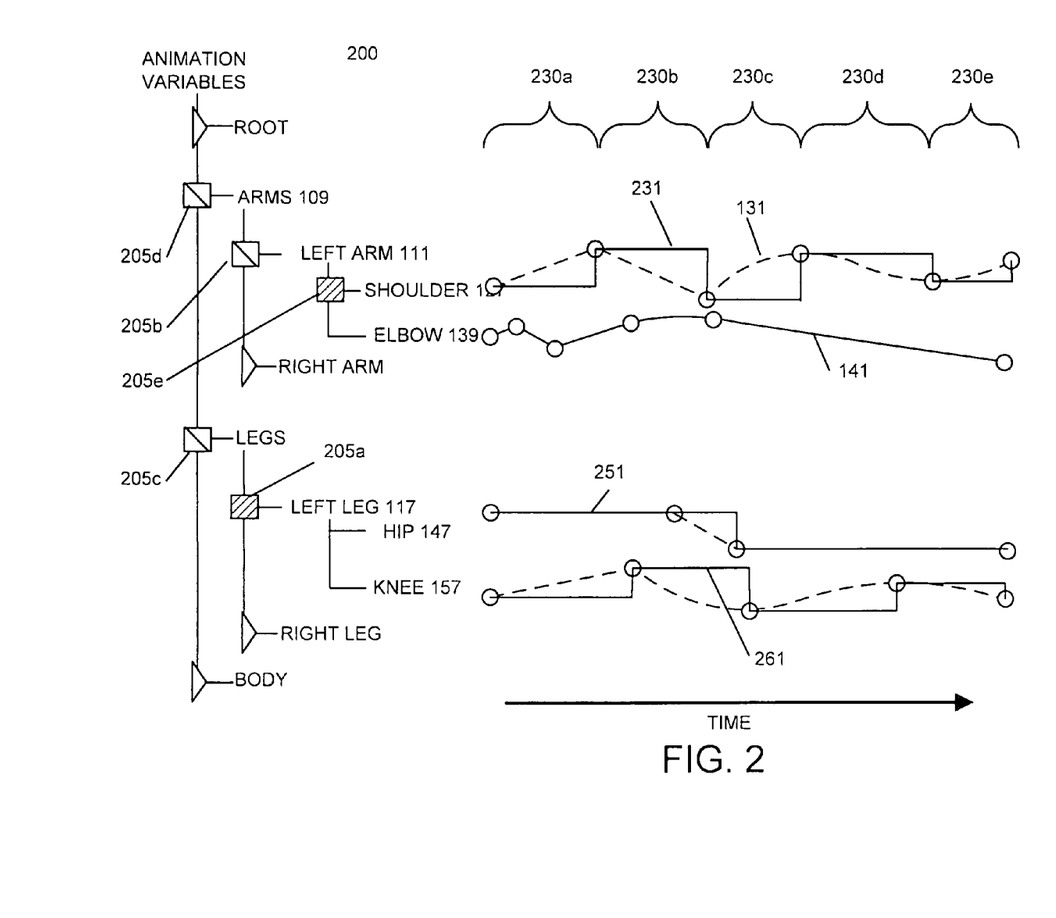
FIG. 2 illustrates an activation of a stepmode animation visualization within an example animation software interface according to an embodiment of the invention.

To assist users in identifying the visual and aesthetic contributions of specific computer graphics variable or animation variable knots to complicated animations, an embodiment of the animation software interface 100 includes a stepmode animation visualization. The stepmode animation visualization emphasizes authored values of computer graphics variables, such as knots, and deemphasizes or hides the generated values of computer graphics variables. This allows users discern the timing and rhythm of specific computer graphics variable knots within complicated animations FIG. 2 illustrates a stepmode animation visualization within an example animation software interface 200 according to an embodiment of the invention. Example animation software interface 200 includes similar elements shown in example animation software interface 100, such as animation variables 127, 137, 147, and 157.

To emphasize the authored values of an animation variable, the stepmode animation visualization temporarily overrides the generated values of an animation variable. An embodiment of the stepmode animation visualization substitutes an authored value of the animation variable in place of one or more of its generated values.

An embodiment of the stepmode animation visualization shown in FIG. 2 overrides each generated value of animation variable 127 with the value of the nearest preceding authored value. For example, the stepmode animation visualization temporarily sets the generated values of animation variable 127 in interval 230*a* to the value of preceding authored knot 129*a*. Similarly, the stepmode animation visualization overrides the generated values of the animation variable 127 in interval 230*b* with the value of preceding authored knot 129*b*, the generated values in interval 230*c* with the value of preceding authored knot 129*c*, the generated values in interval 230*d* with the value of preceding authored knot 129*d*, and the generated values in interval 230*e* with the value of preceding authored knot 129*e*. The values of animation variable 127 are shown by curve 231 when the stepmode animation visualization is activated. For comparison, the curve 131 representing the generated values of animation variable 127 is shown as a dotted line in FIG. 2 for illustration. However, embodiments of the stepmode animation visualization may not display the generated values of an animation variable when the stepmode animation visualization is active.

In further embodiments, the stepmode animation visualization may override the generated values of a computer graphics variable with other authored values of a computer graphics variables, rather than the preceding authored knot.

In an embodiment, users may select one or more computer graphics variables for inclusion in the stepmode animation visualization. Computer graphics variables that are not selected for inclusion in the stepmode animation visualization will be presented with both their authored values and generated values while the stepmode animation visualization is activated. Example animation software interface 200 includes animation variables 127, 147, and 157 in the stepmode animation visualization. Thus, the generated values of animation variables 147 and 157 are also overridden by the stepmode animation visualization. In this example, the stepmode animation visualization substitutes the authored value of the nearest preceding knot for the generated values of animation variables 147 and 157, similar to animation variable 127. For example, animation variables 147 and 157 have the values shown by curves 251 and 261, respectively. Because animation variable 137 is omitted from the stepmode animation visualization in this example, the animation software interface 200 presents the generated values 141 of this animation variable unchanged from that shown in the example of FIG. 1.

An embodiment of the stepmode animation visualization includes hierarchical indicators 205. Hierarchical indicators 205 provide a visual indication of the selection of one or more computer graphics variables for inclusion in the stepmode animation visualization. Hierarchical indicator 205*a* indicates that all of the computer graphics variables within left leg group 117 are selected for inclusion in the stepmode animation visualization. In example animation software interface 200, hierarchical indicator 205*a* is fully shaded to indicate that all of the computer graphics variables within this group are selected. Similarly, hierarchical indicator 205*e* indicates that shoulder animation variable 127 is selected for inclusion in the stepmode animation visualization. In this example, hierarchical indicators 205*b*, 205*c*, and 205*d* are half-shaded to indicate that left arm group 111, legs group 115, and arms group 109, respectively, have a portion of their computer graphics variables selected for inclusion in the stepmode animation visualization.

In an embodiment, animation software interface 200 allows users to select computer graphics variables individually for inclusion in the stepmode animation visualization. In a further embodiment, animation software interface 200 allows users to select multiple computer graphics variables simultaneously. For example, a user may select a hierarchical indicator to include all of the descendent computer graphics variables in the stepmode animation visualization. In another example, a user may select a group to include all of the computer graphics variables of that group in the stepmode animation visualization.

In an embodiment, a user may activate a stepmode animation visualization at any time while viewing or authoring values of computer graphics variables. While active, the stepmode animation visualization overrides the generated values of one or more computer graphics variables. When the stepmode animation visualization is deactivated, the generated values of the computer graphics variables are allowed to have their intended effect. Embodiments of the example animation software interface 200 may change the curves associated with selected computer graphics variables between their generated values and their overriding values to indicate the activation state of the stepmode animation visualization. In a further embodiment, a user may repeatedly activate and deactivate the stepmode animation visualization without reselecting computer graphics variables. In this embodiment, the selection of computer graphics variables affected by the visualization is maintained independently of the activation state of the computer graphics variables.

In an embodiment, the stepmode animation visualization allows users to view and modify the authored values of computer graphics variables while suppressing the generated values of computer graphics variables. For example, animation software interface 200 may display an animation of a character model based on the values of the animation variables 127, 137, 147, and 157. When the stepmode animation visualization is active, the animation will be altered to emphasize the authored values of the animation variables.

Figure 3:
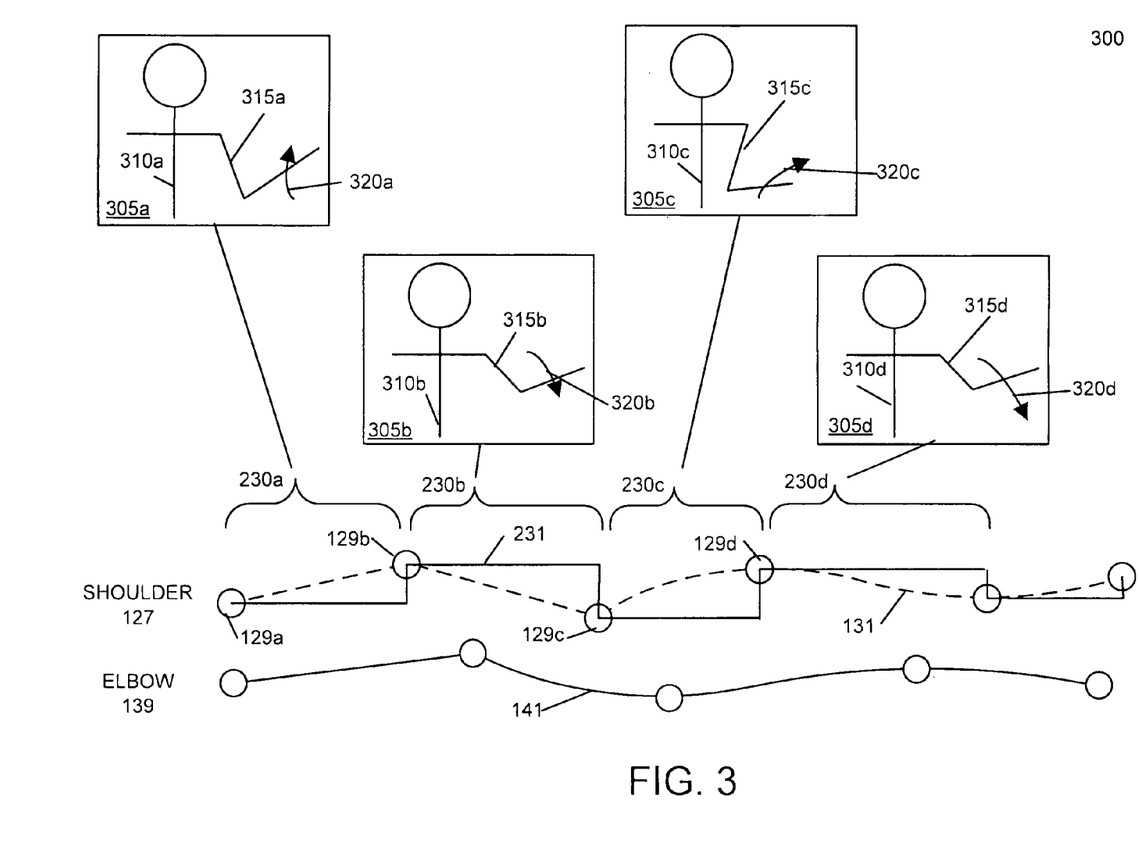
FIG. 3 illustrates an example animation provided by a stepmode animation visualization according to an embodiment of the invention.

FIG. 3 illustrates an example animation 300 provided by a stepmode animation visualization according to an embodiment of the invention. Example animation 300 illustrates the movement of a character model 310 while a stepmode animation visualization is active; however, embodiments of the stepmode animation visualization may be applied to any type and number of objects.

FIG. 3 also includes shoulder and elbow animation variables 127 and 137. In this example, the shoulder animation variable 127 is selected for inclusion in the stepmode animation visualization. Thus, the shoulder animation variable 127 will have the values defined by curve 131 when the stepmode animation visualization is inactive and by the curve 231 when the stepmode animation visualization is active. Embodiments of animation software interfaces may or may not display animation variables and their values while the stepmode animation visualization is active.

Conversely, elbow animation variable 137 is not selected for inclusion in the stepmode animation visualization in this example. Thus, the elbow animation variable 137 will have the values defined by curve 141 regardless of whether the stepmode animation visualization is active.

In an embodiment, the pose of a character model 310 is determined by the values of its animation variables. When the stepmode visualization is inactive, both authored values and generated values of animation variables are provided to animation variable functions to determine the pose of the character model. When the stepmode visualization is active, only authored values of animation variables included in the stepmode animation visualization are provided to animation variable functions to determine the pose of the character model.

While the stepmode animation visualization is active, a user may initiate an animation of character model 310. FIG. 3 illustrates portions 305 of the animation with the stepmode animation visualization active. During time interval 230*a*, portion 305*a* of the animation is displayed. Portion 305*a* presents character model 310*a* posed according to the values of animation variables 127 and 129 during time interval 230*a*. Because the stepmode animation visualization is active, the shoulder animation variable 127 will have the value of authored knot 129*a* during the entire time interval 230*a*. Thus, the upper arm of character model 310*a*, which is controlled by the shoulder animation variable 127, will remain in a stationary position 315*a* as shown in portion 305*a* for the entire time interval 230*a*.

Elbow animation variable 139 is not affected the stepmode animation visualization. Thus, the lower arm of character model 310*a* will move along path 320*a* during interval 230*a* according the authored and generated values of the elbow animation variable 139 defined by curve 141.

Similarly, during time interval 230*b*, portion 305*b* of the animation is displayed. Portion 305*b* presents character model posed according to the values of animation variables 127 and 129 during time interval 230*b*. At the beginning of time interval 230*b*, the upper arm of character model 310*b* abruptly changes from the position 315*a* shown in portion 305*a* of the animation to position 315*b*. The upper arm of character model 310*b* will remain stationary in position 315*b* for the entire time interval 230*b* associated with portion 305*b*. In this example, the position 315*b* of the upper arm during time interval 230*b* is determined by the value of authored knot 129*b* rather than curve 131, because of the stepmode animation visualization.

Portion 305*b* also displays the lower arm of character model 310*b* moving along path 320*b* during interval 230*b* according the authored and generated values of the elbow animation variable 139 defined by curve 141.

At the beginning of time interval 230*c*, the upper arm of character model 310*c* abruptly changes from the position 315*b* shown in portion 305*b* of the animation to position 315*c*. The upper arm of character model 310*c* will remain stationary in position 315*c* for the entire time interval 230*c* associated with portion 305*c*. In this example, the position 315*c* of the upper arm during time interval 230*c* is determined by the value of authored knot 129*c*. Portion 305*c* also displays the lower arm of character model 310*c* moving along path 320*c* during interval 230*c* according the authored and generated values of the elbow animation variable 139 defined by curve 141.

At the beginning of time interval 230*d*, the upper arm of character model 310*d* abruptly changes from the position 315*c* shown in portion 305*c* of the animation to position 315*d*. The upper arm of character model 310*d* will remain stationary in position 315*d* for the entire time interval 230*d* associated with portion 305*d*. In this example, the position 315*d* of the upper arm during time interval 230*d* is determined by the value of authored knot 129*d*. Portion 305*d* also displays the lower arm of character model 310*d* moving along path 320*d* during interval 230*d* according the authored and generated values of the elbow animation variable 139 defined by curve 141.

In an embodiment, the example animation will be displayed at its intended playback speed. In further embodiments, a user may specify a different playback speed for the example animation when the stepmode animation visualization is active. Still further embodiments of the animation software interface may repeat or loop all or a portion of the animation in response to a user request.

Regardless of the playback speed of the animation, each of the portions 305 of the animation will be displayed for a period of time proportional to its associated time interval. In this example, animation variables included in the stepmode animation visualization are held at the most recent previous authored value for the duration of the playback time until the time of the next authored value of the animation variable is encountered. This allows the authored values of animation variables to be emphasized. Because the portions of models associated with selected animation variables remain static for the time intervals between authored values, it is easy for users to distinguish the portions of the animation associated with the selected animation variables from other non-selected animation variables. Furthermore, because these portions 305 of the animation are displayed for a period of time proportional to their associated time intervals, the stepmode animation visualization emphasizes the timing and rhythm of the animation.

In addition to displaying an animation, an embodiment of an animation software interface allows users to modify computer graphics variables while the stepmode animation visualization is active. For example, a user may modify the values of authored knots of animation variables, modify the time values of authored knots of animation variables, and/or add new authored knots to animation variables at any time values. In a further embodiment, an animation software interface allows users to modify computer graphics variables interactively while the stepmode animation visualization is active and the associated animation is being played or looped. In this embodiment, a user can make subtle adjustments to the timing or values of authored knots of selected animation variables and see the results of these adjustments to the animation immediately.

Embodiments of the stepmode animation visualization may override generated values of selected computer graphics variables in a number of different ways. In one embodiment, the stepmode animation visualization overrides the interpolation functions used by the animation software application to create the generated values of computer graphics variables. In this embodiment, the stepmode animation visualization replaces these interpolation functions with a step interpolation function. In another embodiment, the stepmode animation visualization temporarily caches the generated values of the selected computer graphics variables and then replaces these generated values with the appropriate authored values. When the stepmode animation visualization is deactivated, this embodiment restores the cached generated values. In yet another embodiment, the stepmode animation visualization recalculates the generated values of computer graphics variables when it is deactivated, eliminating the need to cache generated values.

Figure 4:
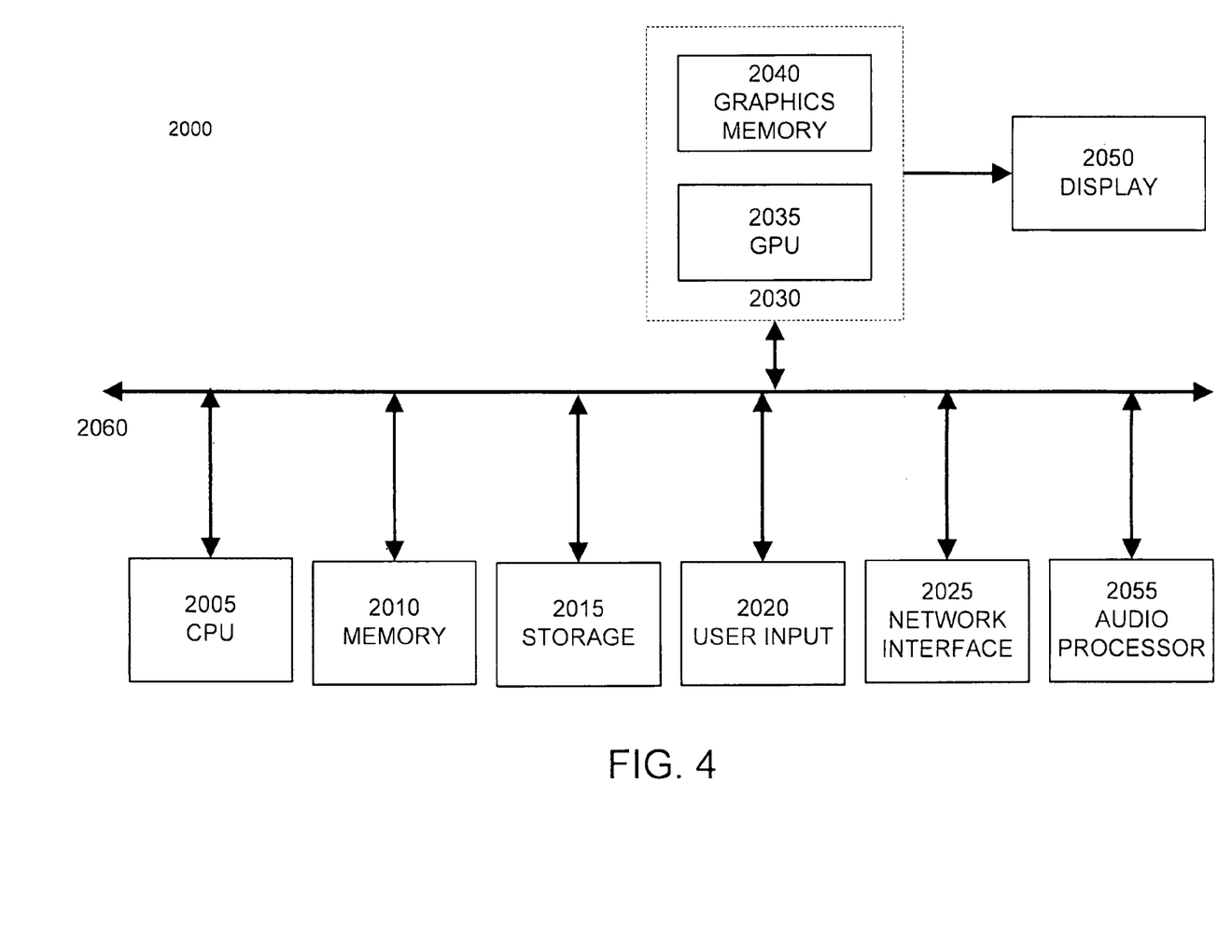
FIG. 4 illustrates a computer system suitable for implementing an embodiment of the invention.

FIG. 4 illustrates a computer system 2000 suitable for implementing an embodiment of the invention. FIG. 4 is a block diagram of a computer system 2000, such as a personal computer, video game console, personal digital assistant, or other digital device, suitable for practicing an embodiment of the invention. Computer system 2000 includes a central processing unit (CPU) 2005 for running software applications and optionally an operating system. CPU 2005 may be comprised of one or more processing cores. Memory 2010 stores applications and data for use by the CPU 2005. Storage 2015 provides non-volatile storage for applications and data and may include fixed or removable hard disk drives, flash memory devices, and CD-ROM, DVD-ROM, Blu-ray, HD-DVD, or other magnetic, optical, or solid state storage devices.

User input devices 2020 communicate user inputs from one or more users to the computer system 2000, examples of which may include keyboards, mice, joysticks, digitizer tablets, touch pads, touch screens, still or video cameras, and/or microphones. Network interface 2025 allows computer system 2000 to communicate with other computer systems via an electronic communications network, and may include wired or wireless communication over local area networks and wide area networks such as the Internet. An audio processor 2055 is adapted to generate analog or digital audio output from instructions and/or data provided by the CPU 2005, memory 2010, and/or storage 2015. The components of computer system 2000, including CPU 2005, memory 2010, data storage 2015, user input devices 2020, network interface 2025, and audio processor 2055 are connected via one or more data buses 2060.

A graphics subsystem 2030 is further connected with data bus 2060 and the components of the computer system 2000. The graphics subsystem 2030 includes at least one graphics processing unit (GPU) 2035 and graphics memory 2040. Graphics memory 2040 includes a display memory (e.g., a frame buffer) used for storing pixel data for each pixel of an output image. Graphics memory 2040 can be integrated in the same device as GPU 2035, connected as a separate device with GPU 2035, and/or implemented within memory 2010.

Pixel data can be provided to graphics memory 2040 directly from the CPU 2005. In some implementations, instructions and/or data representing a scene are provided to renderfarm or set of server computers, each similar to computer system 2000, via the network interface 2025 or storage 2015. The renderfarm generates one or more rendered images of the scene using the provided instructions and/or data. These rendered images are returned to the computer system 2000 for display.

Alternatively, CPU 2005 provides the GPU 2035 with data and/or instructions defining the desired output images, from which the GPU 2035 generates the pixel data of one or more output images. The data and/or instructions defining the desired output images can be stored in memory 2010 and/or graphics memory 2040. In an embodiment, the GPU 2035 includes 3D rendering capabilities for generating pixel data for output images from instructions and data defining the geometry, lighting, shading, texturing, motion, and/or camera parameters for a scene. The GPU 2035 can employ any surface or volume rendering technique known in the art to create one or more rendered images from the provided data and instructions, including rasterization, scanline rendering, REYES or micropolygon rendering, ray casting, ray tracing, image-based rendering techniques, and/or combinations of these and any other rendering or image processing techniques known in the art. The GPU 2035 can further include one or more programmable execution units capable of executing shader programs. GPU 2035 can be comprised of one or more graphics processing unit cores.

The graphics subsystem 2030 periodically outputs pixel data for an image from graphics memory 2040 to be displayed on display device 2050. Display device 2050 is any device capable of displaying visual information in response to a signal from the computer system 2000, including CRT, LCD, plasma, OLED, and SED displays. Computer system 2000 can provide the display device 2050 with an analog or digital signal.

In embodiments of the invention, CPU 2005 is one or more general-purpose microprocessors having one or more homogenous or heterogeneous processing cores. In further embodiments, all or a portion of the graphics subsystem 2030 or GPU 2035 is integrated into CPU 2005.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of visualizing a computer graphics scene, the method comprising:
   receiving a first computer graphics variable defined with respect to an input variable, wherein the first computer graphics variable includes authored values and generated values and wherein the generated values are derived from the authored values;
   receiving an input variable value associated with one of the generated values of the first computer graphics variable;
   determining a state of a stepmode visualization;
   in response to the determination that the state of the stepmode visualization is inactive, providing the associated one of the generated values of the first computer graphics variable to a computer graphics function adapted to specify a first attribute of a computer graphics scene;
   in response to the determination that the state of the stepmode visualization is active, overriding the associated one of the generated values of the first computer graphics variable with one of the authored values of the first computer graphics variables;
   in response to the determination that the state of the stepmode visualization is active, providing the overriding authored value of the first computer graphics variable to the computer graphics function adapted to specify an attribute of a computer graphics scene; and
   displaying an image of the computer graphics scene determined from at least the first attribute using a computer system including a display device.

2. The method of claim 1, wherein overriding the associated one of the generated values of the first computer graphics variable comprises:
   automatically selecting one of the authored values of the first computer graphics variable nearest to the associated one of the generated values of the first computer graphics variable.

3. The method of claim 2, wherein the selecting comprises:
   automatically selecting one of the authored values of the first computer graphics variable preceding the associated one of the generated values of the first computer graphics variable with respect to the input variable.

4. The method of claim 1, wherein the input variable value represents a measure of time in the computer graphics scene.

5. The method of claim 1, further comprising:
receiving a second computer graphics variable defined with respect to the input variable, wherein the second computer graphics variable includes second authored values and second generated values and wherein the second generated values are derived from the second authored values; and
providing one of the second generated values associated with the input variable values to a second computer graphics function adapted to specify a second attribute of a computer graphics scene regardless of the state of the stepmode visualization;
wherein the image of the computer graphics scene is determined at least from the second attribute.

6. The method of claim 1, wherein determining the state of the stepmode visualization comprises:
receiving a selection of at least a portion of a plurality of computer graphics variables associated with the computer graphics scene, wherein the selection includes the first computer graphics variable.

7. The method of claim 1, wherein determining the state of the stepmode visualization comprises:
receiving a user input specifying the state of the stepmode visualization.

8. The method of claim 1, wherein the first computer graphics variable is selected from a group consisting of:
animation variables, shader relationships, weighting relationships, and mappings of influence between computer graphics components.

9. A method of visualizing a computer graphics scene, the method comprising:
receiving animation variables associated with a model in a computer graphics scene, wherein the animation variables define at least a first authored pose of the model at a first scene time, a second authored pose of the model at a second scene time, and generated poses of the model interpolated between the first and second authored poses;
receiving evaluation times between the first and second scene times;
determining a state of a stepmode visualization;
in response to the determination that the state of the stepmode visualization is inactive, posing the model according to the generated poses associated with the evaluation times;
in response to the determination that the state of the stepmode visualization is active, overriding at least a portion of the generated poses of the model associated with the evaluation times with one of the first and second authored poses;
in response to the determination that the state of the stepmode visualization is active, posing at least a portion of the model according to the overriding authored pose for the evaluation times; and
displaying an animation including the model posed at the evaluation times using a computer system including a display device.

10. The method of claim 9, wherein overriding the generated poses comprises:
automatically selecting the one of the first and second authored poses preceding the evaluation times as the overriding authored pose.

11. The method of claim 9, wherein posing at least the portion of the model comprises:
posing a first portion of the model corresponding with the overridden portion of the generated poses according to the overriding authored pose for the evaluation times; and
posing a second portion of the model not corresponding with the overridden portion of the generated poses according to the generated poses between the first and second poses and associated with the evaluation times regardless of the state of the stepmode visualization.

12. The method of claim 11, comprising:
receiving a selection specifying the first and second portions of the model.

13. The method of claim 12, wherein the selection includes a portion of a hierarchy of the animation variables.

14. The method of claim 9, wherein determining the state of the stepmode visualization comprises:
receiving a user input specifying the state of the stepmode visualization.

15. The method of claim 9, further comprising:
in response to the determination that the state of the stepmode visualization is active, displaying an animation including at least the portion of the model posed according to the overriding authored pose for the duration of the evaluation times; and
in response to the determination that the state of the stepmode visualization is inactive, displaying an animation including at least the portion of the model posed according to the generated poses for the evaluation times.

16. The method of claim 9, further comprising:
displaying a visual representation of animation variable values associated with generated poses at the evaluation times in response to the determination that the state of the stepmode visualization is inactive; and
displaying a visual representation of animation variable values associated with the overriding authored poses at the evaluation times in response to the determination that the state of the stepmode visualization is active.

17. A computer-readable storage medium including instructions adapted to direct a computer to perform an operation, the operation comprising:
receiving a first computer graphics variable defined with respect to an input variable, wherein the first computer graphics variable includes authored values and generated values and wherein the generated values are derived from the authored values;
receiving an input variable value associated with one of the generated values of the first computer graphics variable;
determining a state of a stepmode visualization;
in response to the determination that the state of the stepmode visualization is inactive, providing the associated one of the generated values of the first computer graphics variable to a computer graphics function adapted to specify a first attribute of a computer graphics scene;
in response to the determination that the state of the stepmode visualization is active, overriding the associated one of the generated values of the first computer graphics variable with one of the authored values of the first computer graphics variables;
in response to the determination that the state of the stepmode visualization is active, providing the overriding authored value of the first computer graphics variable to the computer graphics function adapted to specify an attribute of a computer graphics scene; and
displaying an image of the computer graphics scene determined from at least the first attribute.

18. The computer-readable storage medium of claim 17, wherein overriding the associated one of the generated values of the first computer graphics variable comprises:
   automatically selecting one of the authored values of the first computer graphics variable nearest to the associated one of the generated values of the first computer graphics variable.

19. The computer-readable storage medium of claim 18, wherein the selecting comprises:
   automatically selecting one of the authored values of the first computer graphics variable preceding the associated one of the generated values of the first computer graphics variable with respect to the input variable.

20. The computer-readable storage medium of claim 17, wherein the input variable value represents a measure of time in the computer graphics scene.

21. The computer-readable storage medium of claim 17, further comprising:
   receiving a second computer graphics variable defined with respect to the input variable, wherein the second computer graphics variable includes second authored values and second generated values and wherein the second generated values are derived from the second authored values; and
   providing one of the second generated values associated with the input variable values to a second computer graphics function adapted to specify a second attribute of a computer graphics scene regardless of the state of the stepmode visualization;
   wherein the image of the computer graphics scene is determined at least from the second attribute.

22. The computer-readable storage medium of claim 17, wherein determining the state of the stepmode visualization comprises:
   receiving a selection of at least a portion of a plurality of computer graphics variables associated with the computer graphics scene, wherein the selection includes the first computer graphics variable.

23. The computer-readable storage medium of claim 17, wherein determining the state of the stepmode visualization comprises:
   receiving a user input specifying the state of the stepmode visualization.

24. The computer-readable storage medium of claim 17, wherein the first computer graphics variable is selected from a group consisting of:
   animation variables, shader relationships, weighting relationships, and mappings of influence between computer graphics components.

* * * * *